(12) United States Patent
Metzler

(10) Patent No.: US 10,240,924 B2
(45) Date of Patent: Mar. 26, 2019

(54) GEODETIC SURVEYING SYSTEM AND METHOD WITH MULTIPLE TARGET TRACKING FUNCTIONALITY

(75) Inventor: Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 899 days.

(21) Appl. No.: 14/344,590

(22) PCT Filed: Sep. 12, 2012

(86) PCT No.: PCT/EP2012/067870
§ 371 (c)(1),
(2), (4) Date: Mar. 12, 2014

(87) PCT Pub. No.: WO2013/037848
PCT Pub. Date: Mar. 21, 2013

(65) Prior Publication Data
US 2014/0350886 A1 Nov. 27, 2014

(30) Foreign Application Priority Data
Sep. 13, 2011 (EP) ...................................... 11181118

(51) Int. Cl.
*G01C 9/00* (2006.01)
*G01C 17/00* (2006.01)
(Continued)

(52) U.S. Cl.
CPC ............ *G01C 15/002* (2013.01); *E02F 9/264* (2013.01); *G01S 7/003* (2013.01); *G01S 17/66* (2013.01);
(Continued)

(58) Field of Classification Search
None
See application file for complete search history.

(56) References Cited

U.S. PATENT DOCUMENTS 4,060,718 A * 11/1977 Huddle .................... G01V 7/06
324/323
5,379,045 A * 1/1995 Gilbert .................... G01S 19/07
342/352
(Continued)

FOREIGN PATENT DOCUMENTS

CN 1310352 A 8/2001
DE 197 107 22 A1 10/1997
(Continued)

OTHER PUBLICATIONS

European Search Report dated Feb. 9, 2012 as received in Application No. EP 11 18 1118.

*Primary Examiner* — Janet L Suglo
*Assistant Examiner* — Leonard S Liang
(74) *Attorney, Agent, or Firm* — Maschoff Brennan

(57) ABSTRACT

A surveying system for surveying and tracking a movable target object that defines a target point includes a surveying device with a sighting unit defining a target axis and a detector for generating a continuously current amount-of-deviation signal dependent on a deviation from an optimal target orientation. A second unit on the target object side enables continuous determination of movements and/or positions of the target object with reference to an external coordinate system. The surveying system includes a target point tracking mode in which respective first measurement data currently generated by the first unit and the respective current amount-of-deviation signal and respective second measurement data currently generated by the second unit are continuously aggregated. On the basis thereof, a control signal is derived for continuous automatic motorized modification of the target axis orientation such that the target axis continuously aims at the target point.

15 Claims, 9 Drawing Sheets

(51) Int. Cl.
- *G01C 19/00* (2013.01)
- *G01C 15/00* (2006.01)
- *E02F 9/26* (2006.01)
- *G01S 17/66* (2006.01)
- *G01S 7/00* (2006.01)
- *G06F 3/01* (2006.01)
- *E02F 3/84* (2006.01)

(52) U.S. Cl.
CPC .............. *E02F 3/842* (2013.01); *E02F 3/847* (2013.01); *G01C 15/00* (2013.01); *G06F 3/011* (2013.01)

(56) References Cited

U.S. PATENT DOCUMENTS

| | | | |
|---|---|---|---|
| 5,852,792 A * | 12/1998 | Nielson | B64G 1/24 244/164 |
| 6,035,254 A | 3/2000 | Nichols | |
| 6,204,955 B1 | 3/2001 | Chao et al. | |
| 6,266,628 B1 * | 7/2001 | Huep | G01C 21/16 33/290 |
| 6,411,371 B1 * | 6/2002 | Hinderling | G01S 7/4811 356/4.01 |
| 6,683,693 B1 * | 1/2004 | O Tsuka | G01C 15/02 356/620 |
| 2005/0057745 A1 * | 3/2005 | Bontje | G01C 15/002 356/139.03 |
| 2007/0064246 A1 * | 3/2007 | Braunecker | G01C 15/002 356/614 |
| 2007/0255525 A1 * | 11/2007 | Lee | G01S 17/10 702/159 |
| 2008/0204699 A1 * | 8/2008 | Benz | G01C 15/002 356/4.01 |
| 2009/0093959 A1 * | 4/2009 | Scherzinger | G01C 21/165 701/470 |
| 2009/0171618 A1 | 7/2009 | Kumagai et al. | |
| 2009/0231582 A1 * | 9/2009 | Aebischer | G01S 17/42 356/364 |
| 2010/0007739 A1 * | 1/2010 | Otani | E02F 3/847 348/159 |
| 2010/0121540 A1 * | 5/2010 | Kumagai | E02F 3/7618 701/50 |
| 2010/0149518 A1 * | 6/2010 | Nordenfelt | G01C 15/002 356/4.01 |
| 2010/0245587 A1 * | 9/2010 | Otani | G01C 15/002 348/169 |
| 2010/0259438 A1 * | 10/2010 | Jones | G01C 15/00 342/22 |
| 2013/0093882 A1 * | 4/2013 | Kotzur | G01C 1/04 348/135 |
| 2013/0162469 A1 * | 6/2013 | Zogg | G01C 15/002 342/357.25 |
| 2014/0214237 A1 * | 7/2014 | Kini | G05D 1/0297 701/2 |

FOREIGN PATENT DOCUMENTS

| | | |
|---|---|---|
| DE | 197 50 207 A1 | 7/1999 |
| DE | 199 267 06 A1 | 12/1999 |
| DE | 199 495 80 A1 | 4/2000 |
| EP | 1 081 459 A1 | 3/2001 |
| EP | 1 662 278 A1 | 5/2006 |
| EP | 1 686 350 A1 | 8/2006 |
| EP | 2 141 450 A1 | 1/2010 |
| EP | 2 219 011 A1 | 8/2010 |
| EP | 2 405 236 A1 | 1/2012 |
| WO | 2008/106999 A1 | 9/2008 |

\* cited by examiner

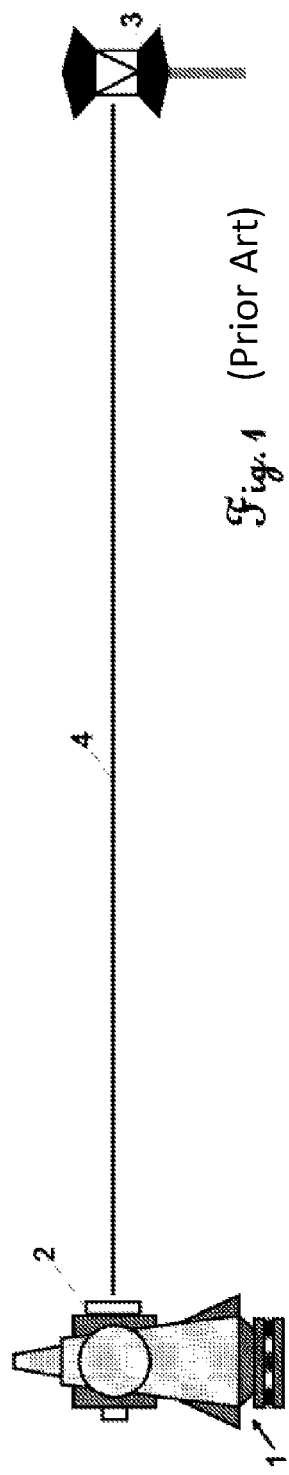
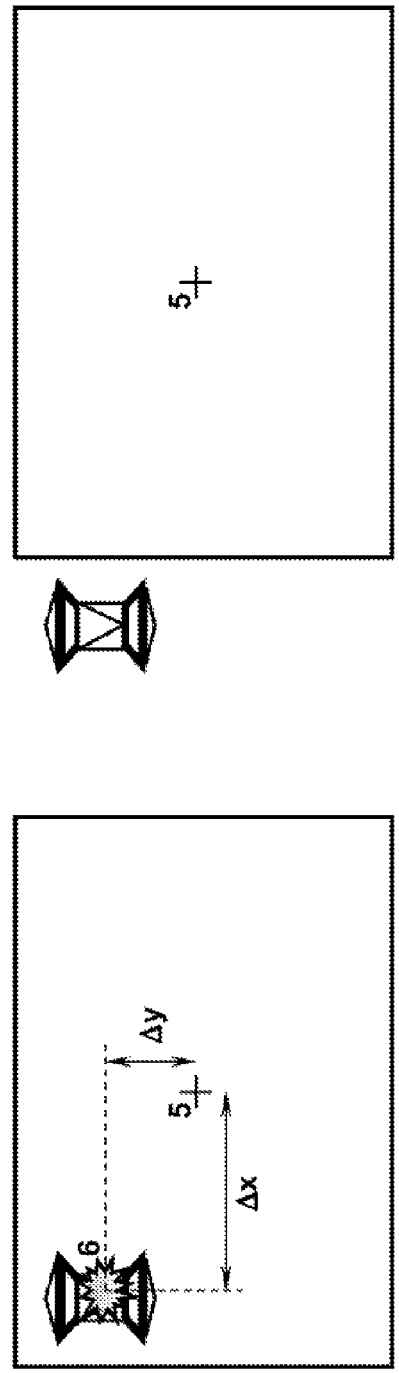
Fig. 1 (Prior Art)
Fig. 2a (Prior Art)
Fig. 2b (Prior Art)

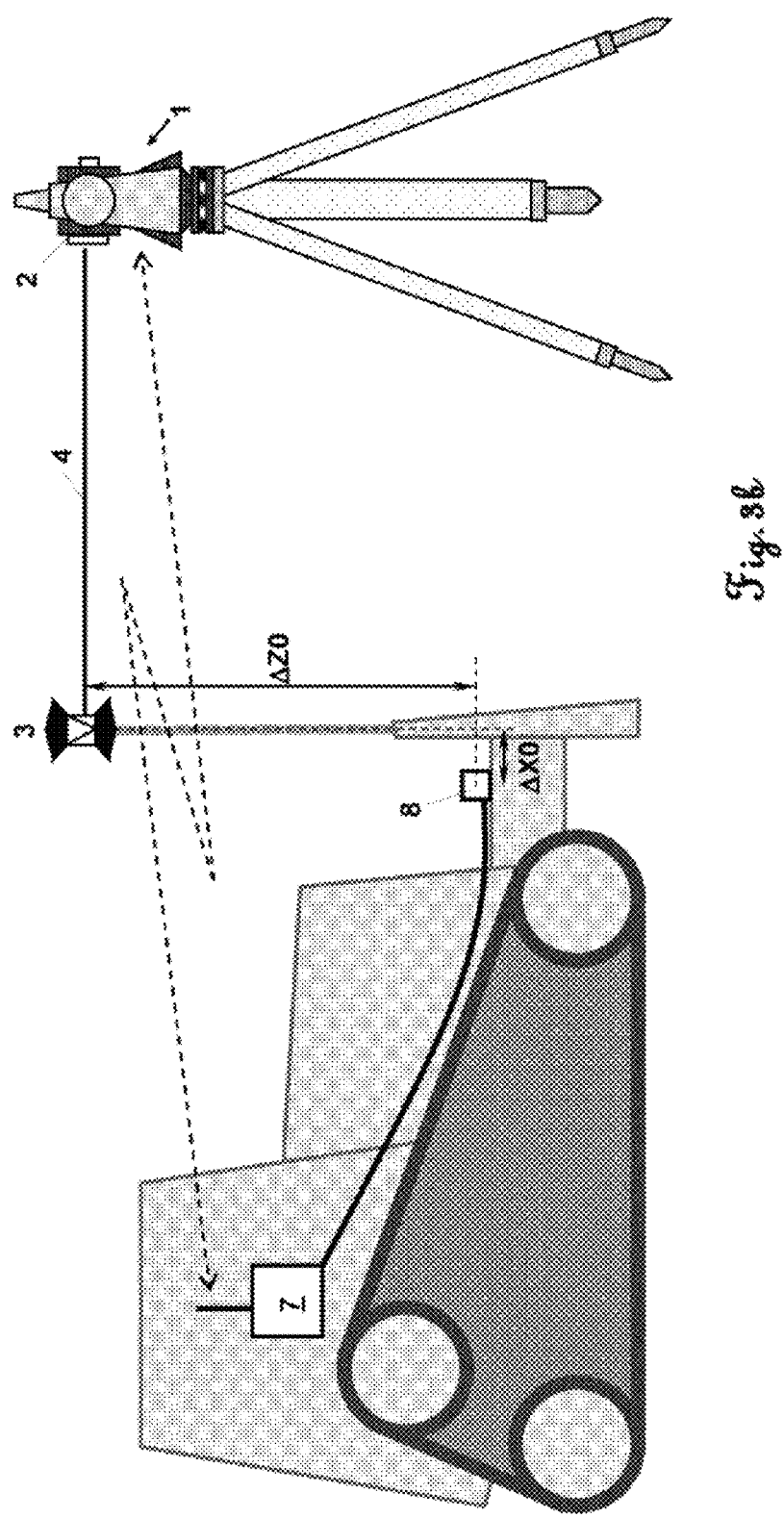

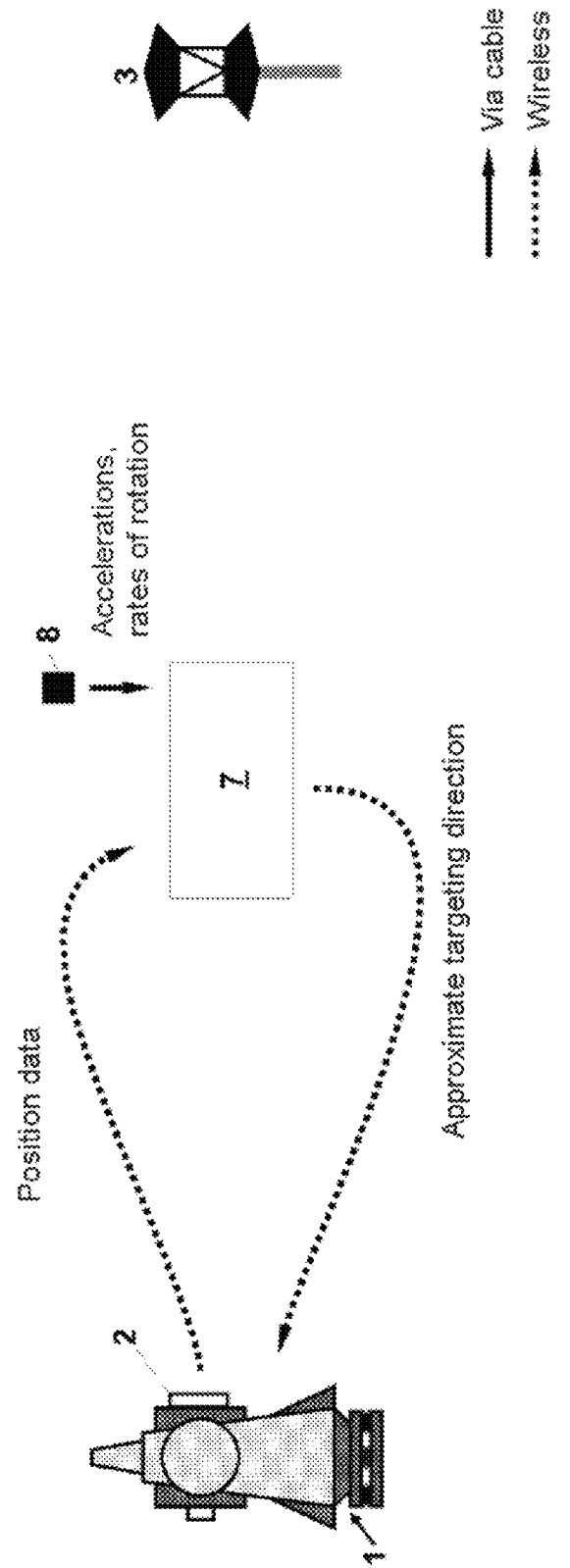

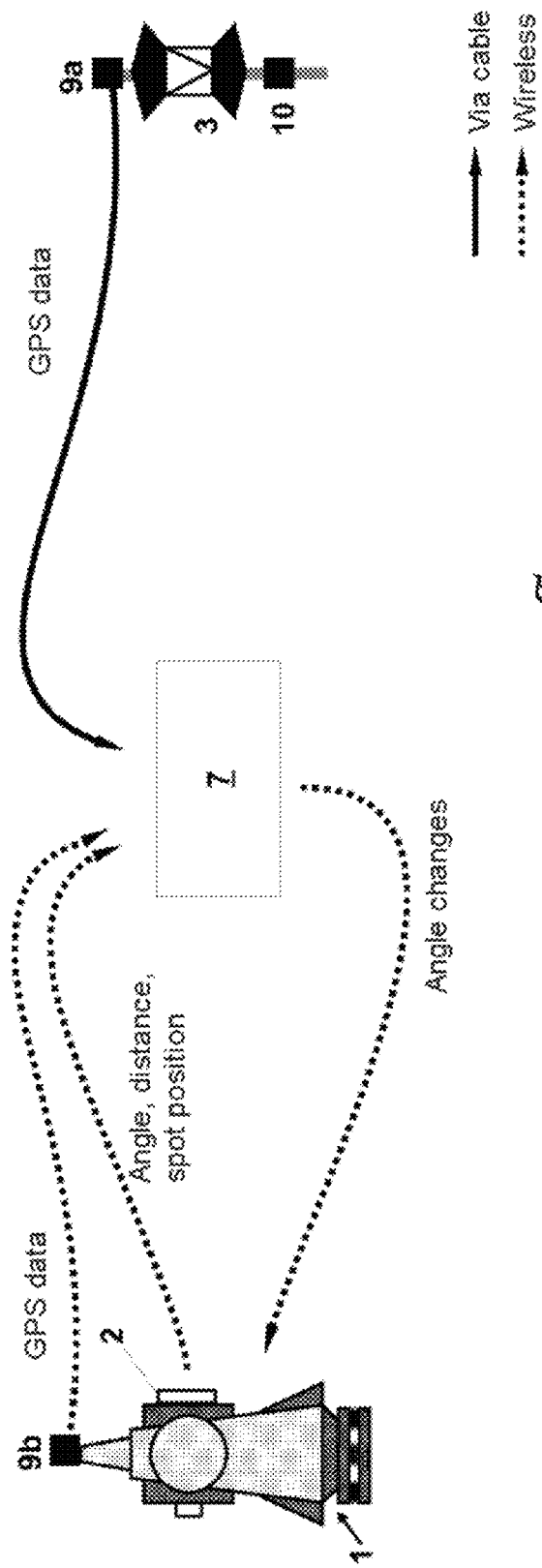

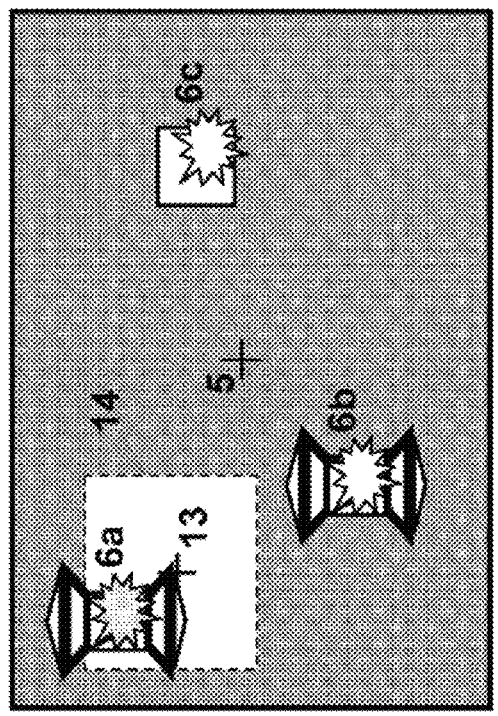
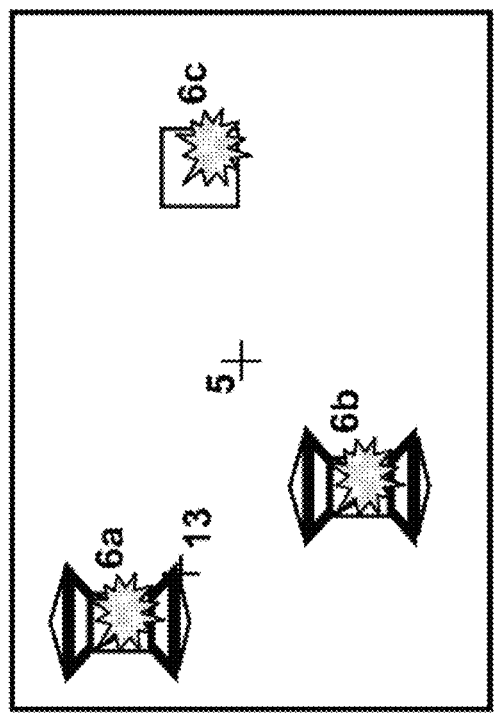

GEODETIC SURVEYING SYSTEM AND METHOD WITH MULTIPLE TARGET TRACKING FUNCTIONALITY

FIELD OF THE INVENTION

The invention relates to a geodetic surveying system, for identifying and, in particular, tracking a movable target object with a target point to be sighted, and to a surveying method that can be performed by means of such a system. The invention relates to an associated computer program product and uses or applications for supervisory and/or controlling construction machines.

BACKGROUND

For surveying a target point, numerous geodetic surveying devices have been known since ancient times. In this case, direction or angle and usually also distance from a measuring device to the target point to be surveyed are recorded and, in particular, the absolute position of the measuring device together with reference points possibly present are detected as spatial standard data.

Generally known examples of such geodetic surveying devices include theodolite, tachymeter and total station, which is also designated as electronic tachymeter or computer tachymeter. One geodetic measuring device from the prior art is described in the publication document EP 1 686 350, for example. Such devices have electrical-sensor-based angle and, if appropriate, distance measuring functions that permit direction and distance to be determined with respect to a selected target. In this case, the angle and distance variables are determined in the internal reference system of the device and, if appropriate, also have to be combined with an external reference system for absolute position determination.

In many geodetic applications, points are surveyed by specifically configured target objects being positioned there or mounted on a movable vehicle. Said target objects consist for example of a plumb staff with a reflector (e.g. an all-round prism) for defining the measurement path or the measurement point. However, surveying systems which operate without reflectors are also possible, such as are described for example in the European patent application bearing the application number EP 10168771.3.

Modern total stations have microprocessors for digital further processing and storage of detected measurement data. The devices generally have a compact and integrated design, wherein coaxial distance measuring elements and also computing, control and storage units are usually present in a device. Depending on the expansion stage of the total station, motorization of the targeting or sighting device and—in the case of the use of retroreflectors (for instance an all-round prism) as target objects—means for automatic target seeking and tracking can additionally be integrated. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer.

For sighting or targeting the target point to be surveyed, geodetic surveying devices of the generic type have a telescopic sight, such as e.g. an optical telescope, as sighting device. The telescopic sight is generally rotatable about a vertical axis and about a horizontal tilting axis relative to a base of the measuring device, such that the telescopic sight can be aligned with the point to be surveyed by pivoting and tilting. Modern devices can have, in addition to the optical viewing channel, a camera for detecting an image, said camera being integrated into the telescopic sight and being aligned for example coaxially or in a parallel fashion, wherein the detected image can be represented, in particular, as a live image on the display of the display control unit and/or on a display of the peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. By way of example, such a sighting device of a geodetic surveying device is described in European patent application No. 09152540.2. Automatic focusing devices for telescopic sights of geodetic devices are known e.g. from DE 197 107 22, DE 199 267 06 or DE 199 495 80.

By way of example, the construction of generic telescopic sights of geodetic devices is disclosed in the publication documents EP 1 081 459 or EP 1 662 278.

Some surveying devices with a high level of expansion in the meantime have an automatic target tracking function for prisms serving as target reflector (ATR: "Automatic Target Recognition"). For this, a further separate ATR light source and an ATR detector (e.g. CCD area sensor) sensitive to the emission wavelength of said light source are conventionally additionally integrated in the telescope.

In the context of the ATR fine targeting and ATR target tracking function, in this case the ATR measurement beam is emitted in the direction of the optical target axis of the sighting device and is retroreflected for example at an all-round prism (as target reflector) and the reflected beam is detected by the ATR sensor. Depending on the deviation of the alignment of the optical target axis from the all-round prism, in this case the impingement position of the reflected radiation on the ATR sensor also deviates from a central sensor area position (i.e. the reflection spot of the ATR measurement beam retroreflected at the prism on the ATR area sensor does not lie in the center of the ATR area sensor and therefore does not impinge on a desired position defined e.g. on the basis of calibration as that position which corresponds to the optical target axis).

If this is the case, then the alignment of the sighting device is usually slightly readjusted in a motorized manner in such a way that the ATR measurement beam retroreflected at the prism impinges highly precisely in the center of the sensor area on the ATR area sensor (i.e. the horizontal and vertical angles of the sighting device are thus iteratively changed and adapted until the center of the reflection spot coincides with the desired position on the ATR area sensor).

In order to ensure the functioning of the automatic targeting on the basis of evaluation of the position of the reflection spot of the ATR measurement beam retroreflected at the prism on the ATR area sensor, it is necessary, before the function starts, to align the sighting device with the target reflector at least approximately in such a way that the ATR measurement beam also impinges on the prism and, having been reflected from there, on the ATR area sensor. For this purpose, it is possible e.g. beforehand to effect manual targeting of the target reflector on the basis of measurement by eye or to perform an automatic coarse targeting function.

Besides the ATR fine targeting function, an automatic target tracking functionality can also be provided in a similar manner and using the same ATR components (such as ATR light source and ATR detector). After ATR fine targeting has been effected (i.e. once the sighting device is aligned with the target in such a way that the center of the ATR measurement radiation reflection spot coincides with the desired position—corresponding to the target axis—on the ATR area sensor), the sighting device can furthermore be tracked to movements of the target "live" and appropriately rapidly in such a way that the center of the ATR measurement radiation reflection spot furthermore remains as accurately as possible and always on the desired position on the ATR area sensor. It is then often stated that the target is "locked on". Problems can occur here if the target moves so jerkily and rapidly that it disappears from the field of view of the ATR detector (i.e. ATR measurement radiation reflected at the target no longer impinges on the ATR area sensor). Other causes of an interruption of the optical link between main or total station and target object may be, for example, unfavorable environmental conditions (precipitation, fog, dust, etc.) or simply obstacles that block the optical link.

The recent prior art discloses various solution proposals for eliminating this problem.

In this case, hereinafter the designation "optical methods" relates to technologies based on light emission and/or detection in the UV to IR range, as can be generated by known laser light sources, for example. "Non-optical methods" designates technologies which either are not based on the detection of electromagnetic radiation or relate to electromagnetic radiation, for example in the case of GPS ("Global Positioning System"), in other frequency ranges.

By way of example, EP 2 141 450 describes a surveying device having a function for automatic targeting of a retroreflective target and having an automatic target tracking functionality. In order in this case, even in the event of rapid and jerky movements, to keep the target in the "locked on" state and not to lose it from the field of view of the fine targeting detector, it is proposed to record images of the target in parallel by means of an overview camera (which is sensitive in the visible wavelength range), to define a specific image excerpt as target and, with the aid of image processing, to track movements of the target (or movements of objects which move concomitantly together with the target), and thereby to make it easier for the retroreflector to be found again and locked on again in the case of the target being lost from the "locked on" state.

However, this solution proposal requires, for its implementation, highly complex image processing software and inevitably leads to a significant interruption time during target tracking by the targeting or sighting unit.

A different solution path based on a GPS ("Global Positioning System") is proposed in U.S. Pat. No. 6,035,254. According to this patent specification, the target object is equipped with a receiver for receiving GPS data. Position information for estimating the position of the target object from received GPS data is communicated to a total station, from which the total station determines how the total station has to be aligned for sighting and tracking the target object. This technical solution appears predominantly to be intended for a first alignment step for sighting the target object. Continuous coordination of GPS data with the position determining data of the total station is not disclosed, and so it is also not possible to infer any indication of stabilizing an optical target tracking or position determining functionality by combination with a different, non-optical target tracking or movement determining functionality. In particular, there is no indication of how optical and non-optical surveying data could be mathematically continuously combined or coordinated with one another using an algorithm, and that stabilized tracking of the position of the target object could be carried out continuously with the aid of the data—coordinated with one another—of the optical position determining functionality and the non-optical movement determining functionality.

US 2009/0171618 discloses a geodetic surveying system comprising a total station with targeting unit and an optical target tracking functionality in an embodiment similar to that known from the prior art, as described above. For a solution to the problem that the optical target tracking, for example on account of rapid and/or jerky movements of the target object, is interrupted by the target object disappearing from the field of view of the targeting unit, US 2009/0171618 discloses a position determining functionality for determining a direction of movement and a movement path of a target object, that is to say corresponding to a movement determining functionality. As a technical implementation for fulfilling the movement determining functionality, an acceleration sensor mounted on the target object or in a construction vehicle at the location of the target object is described, the measured acceleration signals of which acceleration sensor are integrated by means of a supervisory unit, from which the speed of the movement and the distance covered starting from a predefined time, namely respectively the last reception of optical position determining data from the total station, are determined and stored. From the measured acceleration signals, a respective prediction is made for the position of the target object by the time of the next arrival by the optical position determining unit of the total station. The data stored previously are then overwritten. In other words, the data of the movement determining functionality are not continuously combined with the data of the optical target tracking or position determining functionality by means of an algorithm, but rather are in each case discarded until the time of the last communication of optical position determining data. Therefore, the solution to the problem as disclosed in US 2009/0171618 merely fulfils an auxiliary functionality for finding the target object again after the optical contact has been lost. However, a proposal for continuously stabilizing the target tracking process by continuously combining the data from the optical position determining functionality and non-optical movement determining functionality is not indicated, nor can it be inferred.

DE 197 50 207 discloses a geodetic surveying system comprising an inertial measurement device for fulfilling a movement determining functionality supported target tracking functionality. The inertial measurement device can comprise accelerometers and/or gyroscopes, for example. DE 197 50 207 describes various embodiments according to which the inertial measurement device can be arranged on the target object or on a targeting or sighting device and in this case measures movements of the target object or of the targeting or sighting device. As targeting or sighting device, mention is made of, for example, a measuring telescope of a theodolite or a tachymeter for fulfilling an optical position determining functionality. However a proposal for continuously stabilizing the target tracking process by continuously combining the data from the optical position determining functionality and non-optical movement determining functionality is also not indicated in DE 197 50 207, nor can it be inferred from that published patent application.

SUMMARY

Embodiments of the invention provide a geodetic surveying system having an improved target tracking functionality compared with the prior art, whereby in particular the target tracking process can be stabilized and surveying interruptions as a result of a loss of the optical contact between a targeting or sighting unit and the target object can be minimized.

The surveying system according to the invention for surveying and tracking a movable target object that defines a target point comprises:
- a surveying device, in particular designed as a theodolite, total station or laser tracker, which constitutes a first unit, with position determining functionality for determining the position of the target point with reference to an internal coordinate system, comprising
  - a base,
  - a targeting device defining a target axis, wherein the alignment of the target axis is variable relative to the base in a motorized manner for highly precise sighting and tracking of the target point,
  - a photosensitive areal detector for continuously generating a respectively current offset signal directly dependent on a direction and an extent of a deviation between a respectively current, actual alignment of the target axis and a fictitious alignment of the target axis that is aimed highly precisely at the target point,
  - angle measuring functionality for continuously detecting highly precisely the current alignment of the target axis, and
  - distance measuring functionality for continuously determining the respectively current distance to the target point,
- a second unit, provided on the target object side, for providing a functionality for continuously determining movements and/or positions of the target object with reference to an external coordinate system, said functionality being independent of the position determining functionality of the first unit, and
- a supervisory unit connected to the first and second units in terms of data and having evaluation, data processing and control functionality.

According to the invention, in this case the surveying system has a target point tracking mode, in the context of which, in a manner automatically controlled by the supervisory unit in accordance with a predefined algorithm, in particular with the aid of a Kalman filter,
- first measurement data respectively currently generated on the part of the first unit, said first measurement data being at least dependent on
  - the respectively current alignment of the target axis and
  - the respectively current offset signal, and
- second measurement data respectively currently generated on the part of the second unit, said second measurement data being dependent on the respectively currently detected movements and/or positions of the target object (3),
are continuously aggregated, in particular accumulated, and, on the basis thereof, a control signal is derived for continuously automatically changing the alignment of the target axis in a motorized manner in such a way that the target point is continuously sighted by means of the target axis.

In accordance with one specific aspect of the invention, the first unit can be designed for generating the first measurement data with a first rate, in particular approximately between 1 and 20 Hz, and the second unit can be designed for generating the second measurement data with a second rate, in particular approximately between 50 and 500 Hz, wherein the second rate is higher than the first rate, and in the context of the target point tracking mode, the predefined algorithm can be clocked with a third rate, which is higher than the first rate and, in particular, corresponds to the second rate.

Specifically, in this case, moreover, the control signal can be derived with a fourth rate, which is higher than the first rate and, in particular, corresponds to the third rate, and the alignment of the target axis can be continuously automatically changed in a motorized manner on the basis of the control signal for tracking the target object.

The first unit can therefore operate e.g. at 1-20 Hz and the second unit (in particular in the case of an embodiment of the second unit as an MEMS-based inertial measuring unit, also called inertial measurement system) can carry out measurements with a rate of 50-500 Hz or more. In this case, the algorithm (for instance the Kalman filter) can then also yield results with a rate of 500 Hz or more, which can considerably increase the agility and thus the stability of the tracking function according to the invention. Conversely, it is possible to "economize" for instance on the optical measuring components of the first unit, such that they operate e.g. only with a rate of 1 Hz or less and a rate high enough for sufficiently precisely deriving and providing the control signal can nevertheless be achieved.

On the other hand, however, it is also possible—in particular in the case of an embodiment of the second unit as a GNSS module—to implement the detection, generation and provision of the second measurement data with a lower measurement rate than the detection, generation and provision of the first measurement data on the part of the surveying device. In such a case, too, the combination and coordination according to the invention can be highly advantageous since this can then also be effected with the (higher) rate at which the first measurement data are detected, and the second measurement data serve continuously for stabilizing the tracking process.

The algorithm can therefore generally be supplied with the first and second measurement data with different rates and nevertheless yield evaluation results from the compilation (aggregation) of the data with respectively the higher rate, such that the control signal can also be derived with respectively the higher rate.

In accordance with one further specific aspect of the invention, in the context of the target point tracking mode, in a manner automatically controlled by the supervisory unit, the first and second measurement data can be accumulated in each case across a specific preceding time period and, on the basis thereof, with the aid of the algorithm, a prediction is made with regard to a near-future position and/or movement of the target object and the control signal is additionally derived taking account of this prediction.

In accordance with a further specific aspect of the invention, the second unit can have an inertial measurement system or be designed as such, in particular having MEMS-based acceleration sensors and rate-of-rotation sensors, specifically in each case in three axes.

In accordance with a further specific aspect of the invention, however, the second unit can—additionally or alternatively—also have a GNSS module with a GNSS antenna or, as an alternative to the embodiment as an inertial measurement system—can also be embodied directly as a GNSS module.

In this case, the second unit is provided for fitting in a manner rigidly connected to the target object.

As already explained in greater detail above in the context of acknowledging the prior art, the surveying device functioning as a first unit can additionally have, for determining the offset signal, a light source, in particular a laser, which is installed for emitting slightly divergent light beams in the direction of the target axis, for illuminating a retroreflector that constitutes the target object.

The surveying system according to the invention therefore specifically comprises a surveying device forming a first unit, in particular a theodolite/total station or laser tracker, for providing a substantially optical position determining functionality for determining the position of a target object with a target point.

In the case of an embodiment of the surveying device as a theodolite or total station, the targeting device, which is then constructed in particular in the form of a telescopic sight having an objective lens that defines the target axis, can typically be pivotable relative to a base of the surveying device in a motorized manner for the purpose of changing an alignment of the target axis. The targeting device can then have in an integrated fashion the detector for detecting a signal from the sighted target point, wherein the detector is preferably designed in a spatially resolving or areal fashion for making it possible to determine the position of a target point image (for instance of a returned reflection) on the detector. Moreover, such surveying devices embodied as a theodolite or total station are equipped with an angle measuring functionality for highly precisely detecting the alignment of the targeting device and thus also of the target axis.

Furthermore, the surveying system according to the invention is equipped with position change determining means (second unit) present functionally separately from the first unit (that is to say the surveying device) and serving for providing a non-targeting movement or location determining functionality for continuously determining movements or positions of the target object relative to an absolute reference, such that on the basis of this additional movement determining functionality surveying data can be detected relative to an external coordinate system (i.e. relative to the Earth) and can be communicated to the supervisory unit.

These position change determining means (i.e. the second unit) present in addition to the first unit and serving for providing a separate, non-targeting movement detection functionality for the target object are provided in the context of the present invention, for instance, by
  a GNSS (abbreviation of "Global Navigation Satellite System") with a GNSS antenna carried on the target object side, and/or
  an INS (abbreviation of "Inertial Navigation System") carried on the target object side.

The supervisory unit is—to put it another way—therefore equipped with evaluation means for processing data of the surveying device, storing data and controlling the alignment of the targeting device and also evaluation means for processing and storing data of the additional inherent movement or inherent location determining means of the system, which are provided by the second unit.

In this case, the supervisory unit can be present in a manner physically integrated into one of the other components of the system or can be embodied as a dedicated physical unit, such that the supervisory unit can therefore be situated e.g. on the part of the surveying unit, on the part of the target object or elsewhere and—depending thereon—can be integrated into a housing of the surveying unit or can be situated in a separate dedicated housing. All that is essential is the connection in terms of data to the surveying unit (as first unit) and to the second unit provided on the target object side.

The supervisory unit can additionally also consist in each case of a plurality of subunits which are present in a physically dispersed manner, but, in terms of data, are connected to one another and cooperate functionally and thus functionally form one unit for evaluating/storing measurement data and for controlling components of the system.

According to the invention, the evaluation means of the supervisory unit comprise an algorithm, in particular a Kalman filter, by means of which, in the operating state, the data of the optical position determining functionality for determining and tracking the position of the target point are continuously combined and coordinated with the data of the non-targeting inherent movement or inherent location determining functionality of the second unit and the position of the target object is tracked continuously with the aid of the data—coordinated with one another—of the optical position determining functionality and the non-targeting functionality.

Preferably, the non-targeting functionality is in this case designed for determining movements of the target object.

The non-targeting functionality or measuring components (that is to say the second unit or at least components of the second unit) required for providing said functionality can therefore also be arranged in the interior of a vehicle to be tracked, in particular a construction machine or a construction vehicle, or else can be arranged directly adjacent to a target object (for instance a retroreflector) with a target point to be sighted.

In one preferred embodiment of the surveying system according to the invention, the non-targeting inherent movement or inherent location determining functionality—as already mentioned above—is realized by an inertial measurement system equipped, in particular, with acceleration sensors and gyroscopes. In particular, in each case three acceleration sensors and gyroscopes are provided in this case.

In another embodiment of the geodetic surveying system according to the invention, the non-targeting inherent movement or inherent location determining functionality—as likewise already mentioned—can be realized by using measurement data of a global navigation satellite system (GNSS), wherein a GNSS sensor, for determining position, position changes and movements of the target object, is associated with the target object. The GNSS sensor (i.e. a GNSS module with a GNSS receiver antenna) is fitted near the target object, in particular, specifically, an inclination sensor, in particular a two-axis inclination sensor, can also be fitted near the target object, by means of which sensor, for example, inclinations of the GNSS sensor with respect to the target object are detectable. A positional offset between the GNSS sensor and the target object is known from a calibration measurement, for example. By means of the two-axis inclination sensor, however, the position offset between the GNSS sensor and the target object can also be continuously tracked. In the case of just a slight offset and/or relatively low requirements in respect of the measurement accuracy, the measurement values of the two-axis inclination sensor can be disregarded, if appropriate.

The global navigation satellite system GNSS that can be used as additional position change determining means can be embodied—as sufficiently known to a person skilled in the art—according to the following standards, for example: GPS ("Global Positioning System", the system operated by the USA), GLONASS (the system operated by Russia) or Galileo (which is at the planning or construction stage in Europe).

In addition, the main station can also be equipped with a GNSS sensor and serve as a GNSS reference station in a known manner. The accuracy in the processing of the GNSS data can be improved as a result.

The target object to be sighted by the target axis of the surveying system according to the invention can advantageously be embodied as a reflector (in particular retroreflector) (for the traditional determination of an offset signal with the aid of an ATR detector). Preferably, therefore, the target object is embodied as a reflector, and the targeting device has an ATR light source, in particular an infrared laser, and also an ATR detector (e.g. CCD area sensor) that is sensitive in the wavelength range of the ATR light source.

If the targeting device has, as the detector, a camera that carries out imaging in the visible range and serves for detecting an image of the target object, in the specific case, even with embodiments of the target object without a reflector, an offset signal can be determined and generated, as is described in greater detail for instance in the European patent application bearing the application number EP 10168771.3.

If the target object to be sighted is equipped with one or more light sources, for example with light-emitting diodes (LEDs) or a laser, it is also possible, on the basis of an image recorded by a suitable camera from the self-luminous target object, to derive an offset signal depending on the position of the image of the self-luminous target object in the recorded camera image.

The invention further relates to a surveying method for surveying and tracking a movable target object that defines a target point, using the first and second units already described in greater detail above.

The method in this case then involves implementing
  continuously generating first measurement data with the aid of the first unit, said first measurement data being at least dependent on the respectively current alignment of the target axis and the respectively current offset signal,
  continuously generating second measurement data with the aid of the second unit, said second measurement data being dependent on the respectively currently detected movements and/or positions of the target object,
  continuously aggregating, in particular also accumulating, the first and second measurement data using a predefined algorithm, in particular a Kalman filter, and on the basis thereof
  deriving a control signal for continuously automatically changing the alignment of the target axis in a motorized manner in such a way that the target point is continuously sighted by means of the target axis.

In accordance with one specific aspect of the method in this case
  the first measurement data can be generated with a first rate, in particular of approximately between 1 and 20 Hz, and the second measurement data can be generated with a second rate, in particular of approximately between 50 and 500 Hz, wherein the second rate is higher than the first rate, and
  the predefined algorithm can be clocked with a third rate, which is higher than the first rate and, in particular, corresponds to the second rate, and results can thus be obtained from the use of the algorithm with the third rate.

In accordance with a further specific aspect of the method according to the invention in addition
  the control signal can be derived with a fourth rate, which is higher than the first rate and, in particular, corresponds to the third rate, and
  the alignment of the target axis can be continuously changed in a motorized manner on the basis of the control signal.

That means that the algorithm (for instance the Kalman filter) can therefore yield results with a rate which is significantly above the first rate (and which corresponds to the measurement rate of the second unit), which can considerably increase the agility and thus the stability of the tracking function according to the invention. Conversely, it is possible to "economize" for instance on the optical measuring components of the first unit, such that the latter can operate e.g. only with a comparatively low rate and a rate high enough for sufficiently precisely deriving and providing the control signal can nevertheless be achieved.

In accordance with a further specific aspect of the method according to the invention, using the algorithm the first and second measurement data can be accumulated in each case across a specific preceding time period and on the basis thereof a prediction is determined with regard to an expected near-future position and/or movement of the target object. Consequently, this prediction can additionally be taken into account when deriving the control signal.

In accordance with one development of the aspect mentioned above, the first and second measurement data accumulated across a specific preceding time period can be weighted differently in each case for determining the prediction, wherein—as a tendency—data generated for more distant preceding times are weighted less highly than data generated for more recent preceding times from the respectively accumulated first and second measurement data.

In accordance with a further development, the first and second measurement data accumulated across the preceding time period can be checked individually for measurement errors by mutual comparison and, in particular, regression and—on the basis of such a check—data found to be erroneous from the respectively accumulated first and second measurement data can be taken into account with comparatively low weighting, or not taken into account at all, for discerning the prediction.

In other words, therefore, in the context of the surveying method for tracking a movable target object with a target point to be sighted, the following steps can be performed:
  detecting an offset signal, which is dependent on a deviation of the actual alignment of the target axis from a state precisely sighting the target object, by means of a detector—embodied in a spatially resolving or areal fashion—of the surveying device (as first unit);
  determining the position of the target point with the aid of the angle measuring and distance measuring functionality of the surveying device;
  detecting (second) measurement data with regard to a movement or a location of the target object by means of the second unit;
  communicating the data detected and generated on the part of the first and second units to the supervisory unit;
  storing and processing the communicated data by means of the supervisory unit;
  carrying out an algorithm, in particular a Kalman filter, by means of a program stored on the supervisory unit, for continuously combining and coordinating the collected measurement data and, if appropriate, calculating predicted or estimated values for a future alteration of the position of the target object;

continuously deriving a control signal for changing the alignment of the target axis of the targeting device; and continuously guiding the targeting device on the basis of the control signal, such that the target remains continuously sighted by means of the target axis.

One preferred embodiment of the surveying method according to the invention is characterized in that the non-targeting movement determining functionality of the second unit is implemented with the aid of an inertial measurement system, in particular equipped with acceleration sensors, for detecting movements, and rate-of-rotation sensors (for instance gyroscopes) for detecting changes in an angular position.

In accordance with another preferred embodiment of the surveying method according to the invention, the non-targeting inherent location or movement determining functionality is implemented on the basis of measurement data of GNSS sensors that detect positions and movement speeds of the target object.

The invention further relates to a computer program product comprising program code, stored on a machine-readable carrier, for carrying out the process of continuously aggregating the first and second measurement data in accordance with the predefined algorithm, which is stored in the program code, and the process of deriving, on the basis thereof, the control signal of the above-described surveying method according to the invention, in particular when the program is executed on an electronic data processing unit—embodied as a supervisory unit of the above-described surveying system according to the invention.

The surveying system according to the invention and the surveying method according to the invention are described in greater detail purely by way of example below on the basis of specific exemplary embodiments illustrated schematically in the drawings, further advantages of the invention also being discussed. In specific detail:

BRIEF DESCRIPTION OF THE DRAWINGS

FIG. 1 shows an automated total station 1 in accordance with the prior art;

FIG. 2a/b show an illustration of the functioning of a known target recognition or targeting functionality and target tracking functionality;

FIG. 4 shows, in a detailed manner, the data flow between a supervisory unit and various measuring devices and also a total station of a geodetic surveying system according to the invention;

FIG. 8 shows a further embodiment of a geodetic surveying system according to the invention, in which the realization of the non-targeting additional movement determining functionality is based on the use of data of a global position determining system; and FIG. 9a/b show functionalities which can be combined with the previously described exemplary embodiments of a geodetic surveying system and associated surveying method according to the invention.

DETAILED DESCRIPTION

Figure 3A:
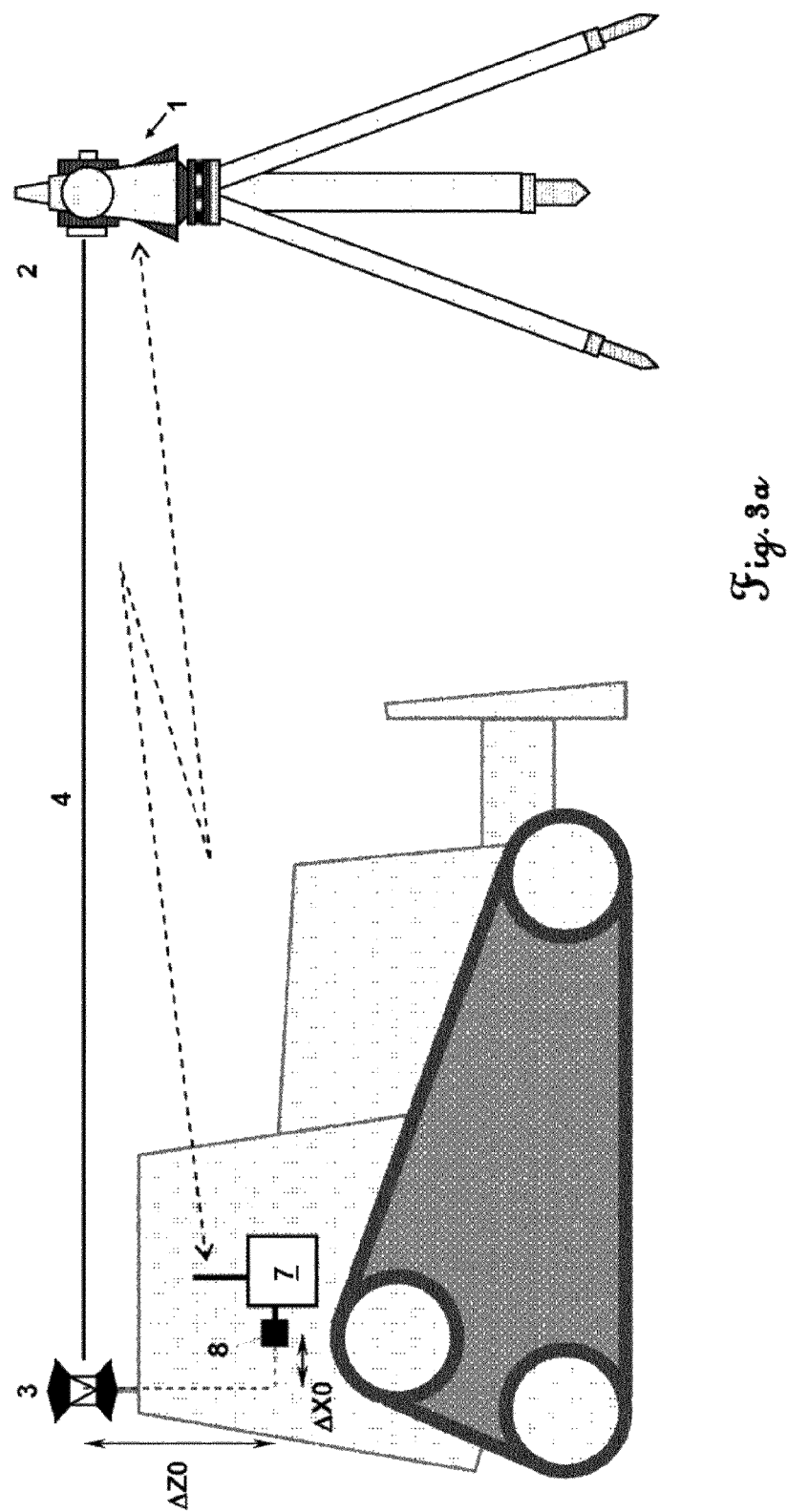
FIG. 3a/b show exemplary embodiments of the geodetic surveying system according to the invention.

The exemplary embodiments described with reference to FIGS. 1 to 9b relate predominantly, but not exclusively, to target-object-oriented guidance of construction machines or construction vehicles, the variable position of which is determined and tracked by means of a target object, which is connected to said construction machines or construction vehicles, from a main station, in particular a total station or a theodolite. Other applications for the automated tracking of a movable target object (e.g. continuous tracking of the current position of a handheld reflector rod, a handheld scanning device (such as handheld scanner or manually guided probe making contact with a measurement point), etc.) are concomitantly included in the invention.

FIGS. 1, 2a and 2b illustrate the starting situation for the present invention. FIG. 1 shows an automated total station 1 in accordance with the prior art, comprising a targeting device 2 having an objective lens unit, for example a telescopic sight or a telescope, which is aligned with a target object 3 and whereby an optical target axis is defined. The target object 3 can be embodied for example as a reflector, in particular as a reflective prism. The total station can be equipped with a laser light source for emitting a laser beam 4 onto the reflector 3, from where the laser beam is reflected back in the direction of the targeting device 2. The targeting device 2 is equipped with a detector, in particular with a spatially resolving detector such an area sensor, e.g. a CCD sensor or a camera.

FIGS. 2a and 2b illustrate the functioning of a known target recognition or targeting functionality and target tracking functionality.

In the context of the targeting functionality, in this case the laser beam 4 is emitted in the direction of the optical target axis of the targeting device 2, said laser beam is retroreflected at the reflector 3 and the reflected beam is detected by the detector. Depending on the deviation of the alignment of the optical target axis from the reflector, the impingement position of the reflected radiation on the detector or the spatially resolving sensor in this case also deviates from a central sensor area position (i.e. the reflection spot of the laser beam 4 reflected at the reflector on the area sensor does not lie in the center thereof and therefore does not impinge on a desired position 5, which was defined e.g. on the basis of calibration as that position which corresponds to the optical target axis).

After coarse detection of the target object by the ATR detector, the targeting device is subsequently aligned more precisely with the target object 3, and subsequent surveying and target tracking take place typically with the emission of a collimated or slightly expanded laser beam 4 in the direction of the target object 3, as described above.

FIG. 2a shows in the ATR image recorded with the aid of the ATR detector [wherein in a known manner the ATR image—shown here purely for explanatory purposes in this figure—is evaluated directly by means of an image processing and normally is not represented in a manner visible to the user on a display] in the center the desired position 5 and the reflection spot 6 of an emitted laser beam 4, said reflection spot being detected by the sensor in the field of view of the targeting device 2. The reflection spot 6 has an offset <Δx, Δy> from the desired position 5.

Instead of a reflector, the target object 3 can for example also carry as a light source, from which a light beam is emitted in the direction of the total station and the detection of which by an area sensor takes place analogously to the manner as illustrated in FIG. 2a.

In accordance with the ascertained deviation <Δx, Δy> of the position of the reflection spot 6 from the desired position 5, it is possible to determine correction angles for the alignment of the targeting device 2 and to perform corresponding corrections by means of driven servomotors until the reflection spot 6 and desired position 5 correspond to one another, that is to say that the horizontal and vertical angles of the sighting or targeting device are iteratively changed and adapted in this way until the center of the reflection spot 6 coincides with the desired position 5 on the detector or area sensor (wherein—as known to a person skilled in the art—in practice often even after just a single iteration for changing the alignment of the targeting device sufficient coincidence of reflection spot 6 and desired position 5 may already have been achieved and sufficiently precise targeting of the target may thus already have been accomplished).

Besides the targeting function, an automatic tracking functionality can also be provided—as likewise already known in the prior art—in a similar manner and using the same electro-optical components (such as laser light source and reflector). After the target object has been targeted (i.e. once the targeting device 2 is aligned with the target object 3 in such a way that the center of the reflection spot 6 coincides with the desired position 5—corresponding to the target axis—on the detector or area sensor), the targeting device 2 can furthermore be tracked to movements of the target object 3 "live" and appropriately rapidly in such a way that the center of the reflection spot 6 furthermore remains as accurately as possible and always on the desired position 5 on the area sensor. It is then often stated that the target is "locked on" (or latched, coupled, locked to the target). Problems can occur here if the target object 3 moves so jerkily and rapidly that it disappears from the field of view of the detector or the cone of the laser beam (i.e. measurement radiation reflected at the target object 3 no longer impinges on the sensor). The situation is analogous for target objects 3 embodied without reflectors and without their tracking by means of a laser beam 4.

Other causes of disturbances may be, for example, unfavorable environmental conditions (precipitation, fog, dust, etc.) or simply obstacles that block the optical link. Moreover, problems can also occur owing to the fact that a plurality of reflectors are situated in the field of view, that further reflective parts are situated in the field of view (which cause disturbing reflections, for instance headlights of vehicles, reflective garments such as jackets, etc.), or else that the ATR laser beam simultaneously strikes a plurality of faces of a single all-round prism and, consequently, a plurality of reflections lying close together are generated by a single all-round prism (so-called "Flying Spots").

According to the invention, therefore, the target tracking mode is effected on the basis of a continuous evaluation of combined and collated measurement data which are continuously generated
both by the surveying device (as first unit) and
by a separate second unit, provided on the target object side, for inherent location or inherent movement determination
and are provided for evaluation.

According to the invention, in the surveying device for this purpose for example on the basis of ATR images recorded continuously by an areal photosensitive ATR detector—as shown schematically for instance in FIG. 2a—in each case a current offset signal is continuously generated, said offset signal being directly dependent on a direction and an extent of a deviation between a respectively current, actual alignment of the target axis and a fictitious alignment of the target axis that is aimed highly precisely at the target point.

An exemplary situation in which the all-round prism illustrated is situated outside the field of view range of the ATR detector is illustrated in FIG. 2b [wherein once again the ATR image—shown here purely for explanatory purposes in this figure—is normally not represented in a manner visible to the user on a display, but rather is evaluated directly by means of image processing].

As an alternative to traditional ATR, wherein a retroreflective target is illuminated with e.g. infrared laser beams and the position of a returned reflection is determined in the ATR image recorded with the aid of an areal detector that is sensitive—in particular only—in the corresponding wavelength range, a digital camera operating in the visible spectral range can also be provided, with which camera images are recorded from the field of view of the target object unit 12 and changes in position of a pattern identified as target object in the camera image serve as a basis for determining changes in position or movements, on the basis of sequentially recorded images. According to the invention, therefore, the generation of the offset signal can also be based on the fact that target mark patterns stored in a supervisory unit 7 are matched with the target object recorded in the camera image, recorded by a camera as the areal photosensitive detector of the surveying device 11. This procedure is analogously described in greater detail in the European patent application bearing the application number EP 10168771.3.

FIG. 3a illustrates a first embodiment of a surveying system according to the invention. A total station 1 having a targeting device 2, equipped with a light source for emitting a laser beam 4 onto a target object 3 to be sighted, is provided. As target object 3, a reflector is mounted on a construction machine or a construction vehicle. From the total station 1, first measurement data with regard to the relative position of the target object with respect to the total station (that is to say in relation to an internal coordinate system of the total station) are generated continuously, wherein angle and distance measurements with respect to the position of the target object (reflector) are carried out and a respective offset signal is detected, for example at time intervals of an order of magnitude of 1-20 Hz.

An inertial measurement system 8 as second unit for providing the functionality—operating independently of the total station—for determining external positions and/or movements of the target object 3 and also a supervisory unit 7 are accommodated in the interior of the construction machine or construction vehicle. The inertial measurement system 8 typically comprises a combination of three accelerometers, which determine accelerations in three orthogonal directions or axes, and three gyroscopes, which determine angular velocities or rotations relative to the three orthogonal axes. The offset <ΔX0, ΔY0, ΔZ0> between the position of the inertial measurement system 8 and that of the target object 3 in the coordinate system of the inertial measurement system 8 may in this case already be known from a separate calibration measurement or may also be determined "on the fly" in the course of work, which will be discussed again in greater detail later.

If sensors which determine the alignment of the machine or of the construction vehicle or of a rod on which the target object 3 is fitted are provided on the object side, then said sensors need not necessarily be fitted near the target object, but rather can also be positioned at a specific offset <$\Delta X0$, $\Delta Y0$, $\Delta Z0$> with respect to the target object 3. Suitable sensors include, in particular, MEMS-based inertial measurement systems, but also (additionally or alternatively) inclination sensors, magnetic electronic compasses, etc.

The measurement values of the inertial measurement system 8 are typically detected and generated with a measurement rate of 50-500 Hz or an even higher frequency and are forwarded for example by cable or by wireless data transmission to the supervisory unit 7 accommodated in the construction vehicle. At the same time, the total station 1 continuously surveys the target object 3, e.g. embodied as a reflector, and in the process generates first measurement data for example with a frequency of 10 Hz on the basis of distance and angle measurements with respect to the target object 3 or on the basis of continuously recorded ATR images. These measurement data are communicated for example wirelessly, e.g. by means of radio waves, to the supervisory unit 7 (also see FIG. 4). The values—measured by the inertial measurement system 8—of accelerations and angular velocities or rotational speeds (as second measurement data) and the data—determined by the total station 1—regarding the position of the target object 3 (as first measurement data) and also—if already available and stored—the position offset <$\Delta X0$, $\Delta Y0$, $\Delta Z0$> between inertial measurement system 8 and target object 3 are combined and coordinated with one another (that is to say aggregated) by means of evaluation means comprising an algorithm, in particular a Kalman filter. In this case, the supervisory unit 7 calculates estimated values for the position and the movement speed of the target object 3 and also the alignment angles of the inertial measurement system, relative to the coordinate system of the total station 1.

On the basis of these estimated values calculated continuously from the combination of the first and second measurement data, correction angle data for the alignment of the targeting device 2 with regard to the target object 3 are calculated and communicated to the total station 1 by the supervisory unit 7. On the basis of these correction stipulations, the motor drives for the alignment of the targeting device 2 are driven in order to continuously maintain the targeting direction with respect to the target object 3 or, as necessary, to track movements of the target object 3 which have taken place and in the course of which said target object has disappeared, possibly even momentarily, from the field of view of the targeting device 2, as a result of which the optical target tracking from the total station 1 is then made possible again.

In this way it is possible to ensure significantly stabler target tracking than with the devices and methods known from the prior art. This is based primarily on the fact that the measurements for determining a movement of the target object 3, said measurements being carried out with the aid of the second unit, are not first used at the time when the optical contact between total station 1 and target object 3 is lost, but rather are concomitantly used continuously for tracking the targeting device 2. By means of, possibly fast, tracking of the alignment of the targeting device 2, said tracking being based on the estimated values determined, a loss of optical contact can advantageously also often be avoided from the outside.

Moreover, with the aid of the algorithm, in particular the Kalman filter, the offset <$\Delta X0$, $\Delta Y0$, $\Delta Z0$> between the position of the inertial measurement system 8 and the target object 3 in the coordinate system of the inertial measurement system 8 (for instance in a settling phase until it is stable) can also firstly be determined or the values stored therefor are checked, determined again and possibly applied as corrections. To put it another way, therefore, besides the position of the reflector in the Kalman filter the offsets <$\Delta X0$, $\Delta Y0$, $\Delta Z0$> or parameters of the IMU (e.g. bias) can also be determined and applied as corrections.

FIG. 3b shows an embodiment of the surveying system according to the invention similar to that in FIG. 3a. In this exemplary embodiment, the retroreflector forming the target object is fitted to the scoop or the blade of a construction vehicle. As illustrated by FIGS. 3a and 3b when considered jointly, the supervisory unit 7 can be physically integrated in the construction machine, integrated in the first unit (that is to say e.g. the TPS), or situated in a dedicated separate external housing, but the supervisory unit can also be constructed from physically dispersed parts which are in each case accommodated in different components of the system, are connected in terms of data and only interact functionally.

FIG. 4 illustrates in greater detail the data flow between the supervisory unit 7 and the various measuring devices (inertial measurement system 8 as second unit and the total station 1 as first unit). Wired data connections (in this example between supervisory unit 7 and inertial measurement system 8) are indicated by solid lines, and wireless connections (between supervisory unit 7 and total station 1) are indicated by dotted lines. It goes without saying that the type of data connection is purely by way of example and can e.g. also be implemented fully wirelessly.

Figure 5:
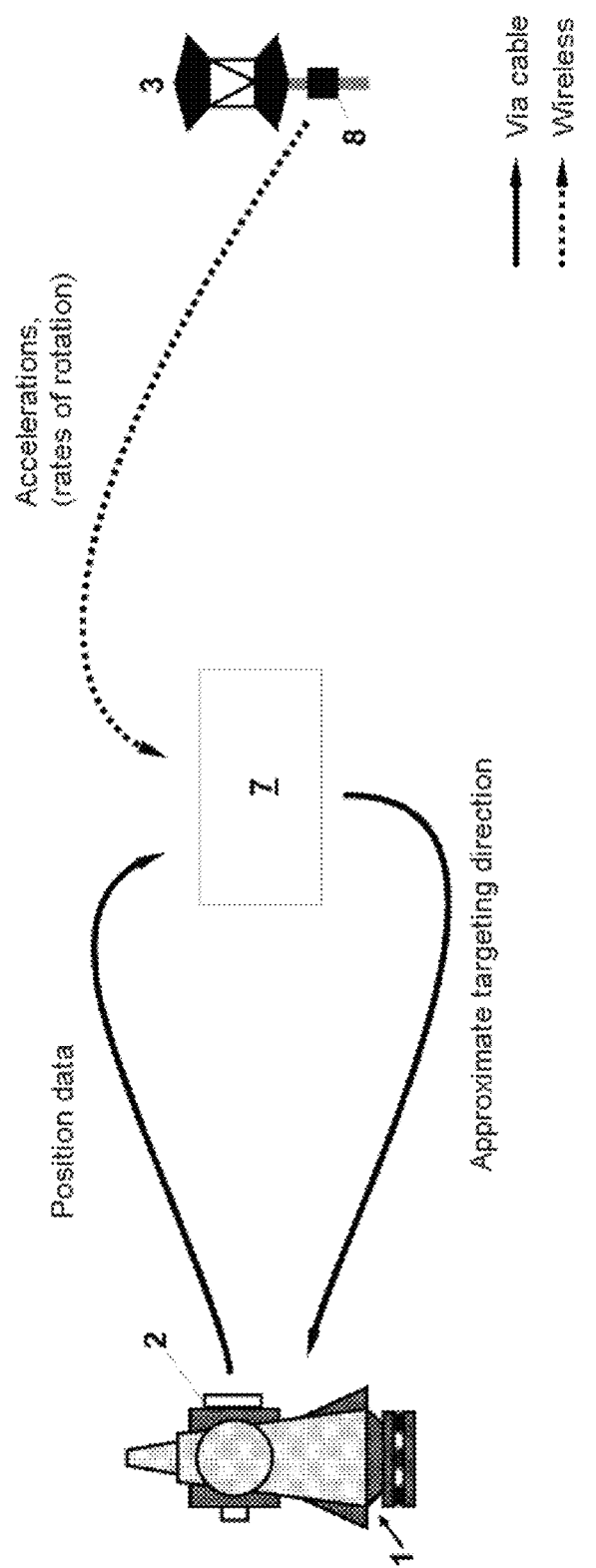
FIG. 5 shows a further exemplary embodiment of a geodetic surveying system according to the invention.

FIG. 5 shows a second exemplary embodiment of a surveying system according to the invention, which differs from the examples in accordance with FIGS. 3a and 3b essentially in that an inertial measurement system 8 is not fitted in a construction vehicle, but rather adjacent to the target object 3, for example a reflector. As a result, the distance between inertial measurement system 8 and target object 3 can be kept small, for example of an order of magnitude of 10 cm, such that a position offset <$\Delta X0$, $\Delta Y0$, $\Delta Z0$> between inertial measurement system 8 and target object 3 is substantially negligible. In accordance with FIG. 5, the supervisory unit 7 is integrated in the total station 1, for example, and the measurement data of the inertial measurement system 8 are communicated for example wirelessly, e.g. by means of radio waves, to the supervisory unit 7. In this example, the supervisory unit 7 is for example permanently wired to the total station 1. The further technical functionalities in accordance with this second exemplary embodiment correspond to those as described with regard to FIG. 3.

Figure 6:
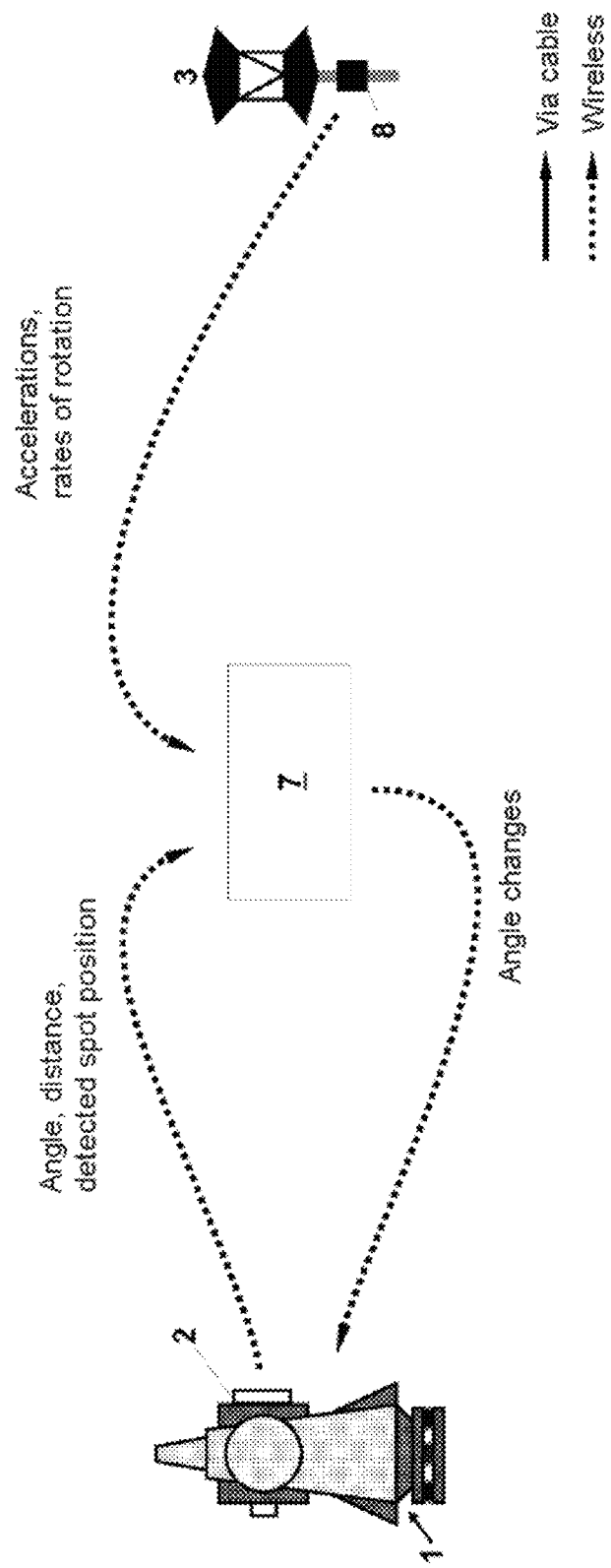
FIG. 6 shows an exemplary embodiment which is largely analogous to FIG. 5, inter alia with the differences with respect to the embodiment in accordance with FIG. 5 that the supervisory unit is accommodated in a construction vehicle and the data transfer to the supervisory unit takes place wirelessly, and from the first unit raw data from the individual sensors (rather than data already preprocessed to form position data) are transmitted to the supervisory unit.

FIG. 6 illustrates an exemplary embodiment that is largely analogous to FIG. 5, with the difference with respect to the embodiment in accordance with FIG. 5 that the supervisory unit 7 is accommodated in a construction vehicle and the data transfer to the supervisory unit 7 is carried out exclusively wirelessly.

As a further difference with respect to FIG. 5, in the example shown here, from the first unit 2—instead of the position data already determined from the raw sensor data on the part of the first unit 2 in accordance with FIG.

5—directly the raw data of the sensors (such as, for instance, angle, distance and spot position) are communicated to the supervisory unit 7, where they are processed further and married to the second measurement data of the second unit (such as accelerations, rates of rotation).

Furthermore, in the case illustrated here by way of example, the approximate targeting direction derived from the married data is not transmitted to the surveying device, rather the control signals furthermore determined therefrom for the motorization of the first unit are transmitted and have the effect of the target axis being tracked to the target object.

Figure 7:
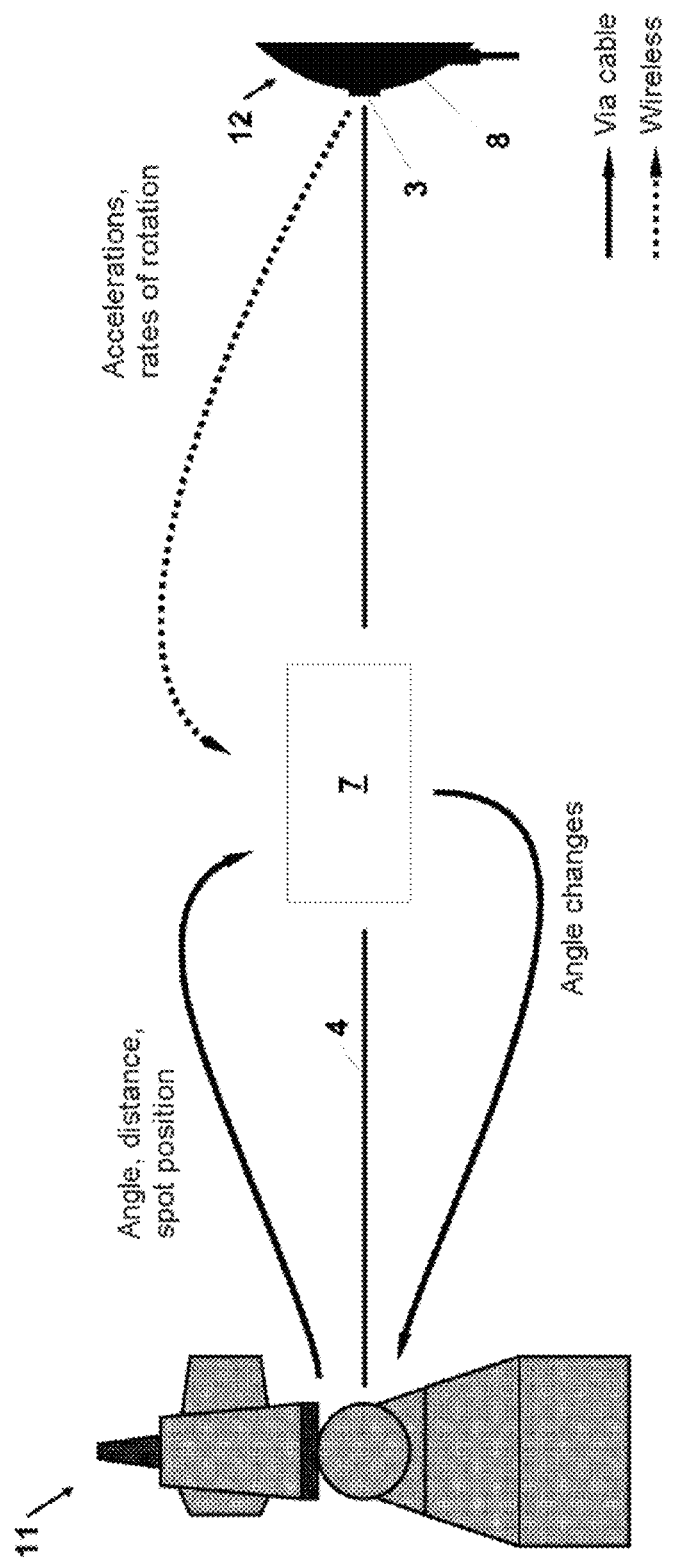
FIG. 7 shows a further embodiment of a geodetic surveying system according to the invention.

FIG. 7 illustrates an embodiment of a geodetic surveying system according to the invention in which an inertial measurement system 8 is integrated into a target object unit 12, the current position or position changes of which are determined and tracked by a surveying device 11 for target tracking, which is embodied here as a laser tracker, for example. The target object unit 12 can be equipped, as a handheld touch probe or laser scanning unit, with a reflector as target object 3 for reflecting (laser) light emitted by the laser tracker 11.

In this case, the laser tracker 11—for detecting an offset of the actual alignment of the target axis from a state that precisely sights the target object—is typically equipped with a light source for emitting a laser beam 4 in a specific direction and a preferably spatially resolving detector, e.g. embodied in an areal fashion, for receiving laser light reflected from the target object 3. The offset signal can then be generated with the aid of this detector.

Therefore, in a manner similar to that described above with regard to the other exemplary embodiments of a geodetic surveying system according to the invention, the laser tracker 11 determines angular alignment, an offset from the precisely sighted state and also, in particular, a distance with respect to the target object 3 for example with a measurement rate of the order of magnitude of 10 Hz-100 Hz. A supervisory unit 7 can be integrated in the laser tracker 11, for example, and thus communicate in a wired manner data for optically determining the position of the target object and control signals for changing the alignment of the target axis. Said control signals are determined by the supervisory unit 7 inter alia on the basis of measurement data—for example received wirelessly from the inertial measurement system 8—regarding movements and movement changes of the target object unit 12, detected with a measurement rate of e.g. 100 Hz-500 Hz (or even faster).

Described in greater detail, therefore, the values—measured by the inertial measurement system 8—of accelerations and angular velocities or rotational speeds (as second measurement data) and the data—determined by the laser tracker 11—regarding the position of the target object 3 (as first measurement data) are combined and coordinated with one another (i.e. aggregated) by means of evaluation means comprising an algorithm, in particular a Kalman filter. In this case, the supervisory unit 7 calculates estimated values for the position and the movement speed of the target object 3 and also the alignment angles of the inertial measurement system 8, relative to the coordinate system of the laser tracker 11.

On the basis of these estimated values calculated continuously from the combination of optical position determination and inherent location or inherent movement determination carried out by the second unit, the control signal with correction angles for the alignment of the target axis with respect to the target object 3 is calculated in the context of the tracking mode and made available to the laser tracker 11. On the basis of said control signals, motor drives for the alignment of the target axis are driven in order to change the targeting direction in such a way that the target object 3 remains continuously sighted. As necessary, therefore, even in the case of correspondingly jerky, widely offset movements of the target object 3 in the course of which said target object disappears, possibly even momentarily, from the field of view of the areal detector of the laser tracker 11, said detector being the offset signal, the target axis can be tracked to the target so rapidly that the tracking of the target continues in a stable manner. The motorized beam tracking on the basis of the calculated estimated values also makes it possible, in particular, to avoid delay problems, for example on the basis of the time for the calculation of the control data (in particular angle correction values or angle adjustment values) by the supervisory unit 7 and the data or command transfer to the actuating motors of the laser tracker 11.

FIG. 8 illustrates a further embodiment of a surveying system according to the invention, in which the realization of the functionality provided by the second unit for continuously determining movements and/or positions of the target object with reference to an external coordinate system is based on the use of a global navigation satellite system ("GNSS", in particular the "GPS"—Global Positioning System—operated by the USA).

A GNSS module 9a with a GNSS antenna is fitted near a reflector as target object 3. Moreover, an inclination sensor, in particular a two-axis inclination sensor 10, and/or a magnetic compass can additionally be mounted adjacent to the target object 3. A position offset <ΔX0, ΔY0, ΔZ0> between the GNSS module 9a and the target object 3 is known from a calibration measurement, for example, or can also subsequently be derived "on the fly" on the basis of the algorithm. The position offset between the GNSS module 9a and the target object 3 can, however, also be continuously tracked by means of the two-axis inclination sensor 10. In the case of just a slight offset and/or relatively low requirements in respect of the measurement accuracy, the measurement values of the two-axis inclination sensor 10 can be disregarded, if appropriate.

Target object 3, GNSS module 9a and two-axis inclination sensor 10 can be fitted to a construction machine or a construction vehicle, for example and a supervisory unit 7 can be accommodated in the interior of the construction machine or construction vehicle. In such a case, the measurement values of the GNSS module 9a and of the two-axis inclination sensor 10 (as second measurement data) are communicated to the supervisory unit 7 for example by cable, indicated by a solid line. It goes without saying that a wireless data transfer is also possible.

At the same time, the horizontal angle, the vertical angle, an offset signal and also, in particular, the distance with respect to the target object 3 are continuously determined (as first measurement data) by the total station 1, which constitutes the first unit, in a manner analogous to that described in the previous exemplary embodiments with reference to FIGS. 3 to 7. The total station 1 communicates with the supervisory unit 7 for example wirelessly, e.g. by means of radio waves.

As already explained above with reference to FIG. 2a, deviations <Δx, Δy> of the position of a reflection spot 6 of a laser beam 4 emitted by the total station 1 and reflected by the target object 3 from a desired position 5 on the ATR sensor (or the image detected by the ATR sensor) can be determined, correction angles for the alignment of a targeting device 2 of the total station 1 can be calculated from said deviations and corresponding corrections can be performed by means of driven actuating motors until reflection spot 6 and desired position 5 correspond to one another, that is to say that the horizontal and vertical angles of the sighting or targeting device are iteratively changed and adapted in this way until the center of the reflection spot 6 coincides with the desired position 5 on a detector or area sensor of the targeting device 2.

The first measurement data determined with the aid of the total station 1 can then be combined by the supervisory unit 7 by means of an algorithm, in particular a Kalman filter, with the second measurement data (that is to say position and speed measurement data of the GNSS module 9a and measurement data of the two-axis inclination sensor 10), in particular taking account of the known position offset <ΔX0, ΔY0, ΔZ0> between the GNSS module 9a and the target object 3, and can be used for stable tracking of the target object 3.

In particular, the first and second measurement data are in each case accumulated across a specific preceding time period and, on the basis of combination and comparison of the accumulated data, a prediction is made with regard to an expected near-future position and/or movement of the target object.

The control signal for target tracking can then be derived additionally taking account of this prediction. This circumstance can be useful in order e.g. to reduce latency problems (for instance caused by data communication, calculation, etc.).

The calculated (i.e. in the specific case of the prediction also estimated or expected) position data can, however, additionally also be used for guiding or controlling or supervising the construction machine or the construction vehicle.

In accordance with a further aspect of the invention, in this case the total station 1 forming the first unit can also additionally be equipped with a GNSS sensor 9b. The use of two GNSS sensors 9a, 9b enables—in a manner known to a person skilled in the art—differential data processing, whereby the accuracy of position and/or speed determination is increased.

FIGS. 9a and 9b illustrate functionalities which can be combined with the above-described exemplary embodiments of a geodetic surveying system and associated surveying method according to the invention.

FIG. 9a illustrates a situation in which a plurality of reflection spots 6a, 6b, 6c of the emitted laser beam 4 are detected by the ATR detector of the targeting device 2 and used for further evaluation with regard to an offset of the reflections from the desired position 5 by means of image processing. By way of example, a reflection spot 6a originates from the target object 3 to be tracked, a reflection spot 6b originates from a second target object, which is embodied e.g. as a reflector and is mounted on a further construction vehicle, crossing the targeting direction of the targeting device 2, and a reflection spot 6c originates from some other reflective object, e.g. a vehicle headlight or a reflective garment. Other reasons for detection of a plurality of reflection spots may be unfavorable ambient conditions such as rain, for example, which lead to scattering of the reflections.

In a situation in accordance with FIG. 9a in which a plurality of reflection spots 6a, 6b, 6c of the emitted laser beam 4 are detected by the detector of the targeting device 2 and used for further evaluation with regard to an offset from the desired position 5, a reflection spot 6a that is actually to be identified for the tracking of the target object 3 is determined in the manner described below. An alignment of the optical target axis that is determined from the setting data for the motor-controlled alignment of the targeting device 2 of the total station is noted beforehand as an expected impingement point 13 of a reflection spot on the detector, and the distance from all the detected reflection spots 6a, 6b, 6c is calculated. The reflection spot closest to the inserted expected impingement point 13 is identified as the reflection spot from the target object 3 to be tracked. The target tracking functionality can subsequently be continued in a manner analogous to that described above.

Alternatively, as illustrated in FIG. 9b, target tracking can be effected in accordance with an image excerpt 14 which is to be defined by a system operator and which prescribes a corresponding restriction of the target tracking to the region defined by the image excerpt. Then, only the reflection spot 6a situated within said defined image excerpt 14 is tracked further, and the positions of the reflection spots 6b, 6c are not taken into account any further. This variant according to the invention for fulfilling a target tracking functionality further improves the robustness toward disturbances. In addition, the restriction to only an image excerpt 14 in the ATR image reduces the expenditure of time for image processing.

It goes without saying that these illustrated figures merely schematically illustrate possible exemplary embodiments. The different approaches can likewise be combined with one another and with methods from the prior art.

Analogously to the above descriptions with regard to the improved tracking of a target object, the central concept of the invention can also be utilized to allow a surveying device (as first unit) to track two targets (e.g. reflectors) alternately. For this purpose, by way of example, one IMU (as second unit) can be coupled to two reflectors (which are also mutually rigidly connected to one another) or any respective dedicated IMU can be used for each independent reflector (that is to say in total a plurality of second units or in each case one second unit per target object) and a plurality of algorithms (one respective algorithm for each target object) can in each case proceed in parallel (wherein the pauses for feeding the algorithm can in each case mutually alternate with the first measurement data).

What is claimed is:

1. A surveying system for surveying and tracking a movable target object that defines a target point, comprising:
   a surveying device that constitutes a first unit, with position determining functionality for determining the position of the target point with reference to an internal coordinate system, wherein the surveying device includes:
   a base;
   a targeting device defining a target axis, wherein the alignment of the target axis is variable relative to the base in a motorized manner for precise sighting and tracking of the target point;
   a photosensitive areal detector for continuously generating a current offset signal directly dependent on a direction and an extent of a deviation between a current, actual alignment of the target axis and a fictitious alignment of the target axis that is aimed highly precisely at the target point;
   angle measuring functionality for continuously precisely detecting the current alignment of the target axis; and
   distance measuring functionality for continuously determining the current distance to the target point;
   a second unit, provided on the target object side, for providing a functionality for continuously determining movements and/or positions of the target object with reference to an external coordinate system, said functionality being independent of the position determining functionality of the first unit; and a supervisory unit connected to the first and second units in terms of data and having evaluation, data processing and control functionality, wherein:

the surveying system has a target point tracking mode, in the context of which, in a manner automatically controlled by the supervisory unit in accordance with a predefined algorithm:
- first measurement data continuously generated on the part of the first unit, said first measurement data being at least dependent on the current alignment of the target axis and the current offset signal, and
- second measurement data continuously generated on the part of the second unit, said second measurement data being dependent on the currently detected movements and/or positions of the retroreflector, are continuously aggregated and, on the basis thereof, a control signal is derived for continuously automatically changing the alignment of the target axis in a motorized manner in such a way that the target point is continuously sighted by means of the target axis, wherein:

the first unit is configured to generate the first measurement data with a first rate;

the second unit is configured to generate the second measurement data with a second rate, wherein the second rate is higher than the first rate; and in the context of the target point tracking mode, the predefined algorithm is clocked with a third rate, which is higher than the first rate and corresponds to the second rate.

2. The surveying system as claimed in claim 1, wherein:
the a first rate is in a range from approximately 1 to 20 Hz; and
the second rate is in a range from approximately 50 and 500 Hz.

3. The surveying system as claimed in claim 1, wherein:
in the context of the target point tracking mode, the control signal is derived with a fourth rate, which is higher than the first rate and corresponds to the third rate; and
the alignment of the target axis is continuously automatically changed in a motorized manner on the basis of the control signal.

4. The surveying system as claimed in claim 1, wherein:
in the context of the target point tracking mode, in a manner automatically controlled by the supervisory unit, the first and second measurement data are aggregated in each case across a specific preceding time period and, on the basis thereof, with the aid of the algorithm, a prediction is made with regard to a near-future position and/or movement of the target object and the control signal is additionally derived taking account of this prediction.

5. The surveying system as claimed in claim 1, wherein:
the second unit has an inertial measurement system having MEMS based acceleration sensors and rate of rotation sensors, in each case in three axes.

6. The surveying system as claimed in claim 1, wherein:
the second unit has a GNSS module having a GNSS antenna.

7. A surveying method for surveying and tracking a movable target object that defines a target point, using the first and second units as claimed in claim 1, comprising:
continuously generating first measurement data with the aid of the first unit, said first measurement data being at least dependent on the respectively current alignment of the target axis and the respectively current offset signal, wherein the first measurement data is generated with a first rate;

continuously generating second measurement data with the aid of the second unit, said second measurement data being dependent on the respectively currently detected movements and/or positions of the target object, wherein the second measurement data is generated with a second rate, wherein the second rate is higher than the first rate;

continuously aggregating the first and second measurement data using a predefined algorithm;

deriving, on the basis thereof, a control signal for continuously automatically changing the alignment of the target axis in a motorized manner in such a way that the target point is continuously sighted by means of the target axis; and obtaining results from the use of the predefined algorithm that is clocked with a third rate, which is higher than the first rate and corresponds to the second rate.

8. The surveying method as claimed in claim 7, wherein:
the a first rate is in a range from approximately 1 to 20 Hz; and
the second rate is in a range from approximately 50 and 500 Hz.

9. The surveying method as claimed in claim 7, further comprising:
deriving the control signal with a fourth rate, which is higher than the first rate and corresponds to the third rate; and
continuously changing the alignment of the target axis in a motorized manner on the basis of the control signal.

10. The surveying method as claimed in claim 7, further comprising:
using the algorithm to accumulate the first and second measurement data, in each case across a specific preceding time period; and
on the basis thereof, determining a prediction with regard to a near future position and/or movement of the target object, the control signal being additionally derived taking account of said prediction.

11. A computer program product comprising program code, stored on a non-transitory machine readable carrier, for performing:
the process of continuously aggregating the first and second measurement data in accordance with the predefined algorithm, which is stored in the program code; and
the process of deriving, on the basis thereof, the control signal of the surveying method as claimed in claim 7.

12. The computer program product as claimed in claim 11, wherein:
the first unit is configured to generate the first measurement data with a first rate in a range from approximately 1 to 20 Hz;
the second unit is configured to generate the second measurement data with a second rate in a range from approximately 50 and 500 Hz, wherein the second rate is higher than the first rate;
in the context of the target point tracking mode, the predefined algorithm is clocked with a third rate, which is higher than the first rate and corresponds to the second rate;

in the context of the target point tracking mode, the control signal is derived with a fourth rate, which is higher than the first rate and corresponds to the third rate; and the alignment of the target axis is continuously automatically changed in a motorized manner on the basis of the control signal.

13. The surveying system as claimed in claim 1, wherein:
the second unit is provided for fitting in a manner rigidly connected to the target object.

14. The surveying system as claimed in claim 1, wherein:
the surveying device has a laser that emits slightly divergent light beams in the direction of the target axis, for illuminating a retroreflector that constitutes the target object.

15. The surveying system as claimed in claim 1, wherein:
the first measurement data and the second measurement data are continuously aggregated using a Kalman filter.

\* \* \* \* \*